(12) United States Patent
Vaught et al.

(10) Patent No.: US 9,024,844 B2
(45) Date of Patent: May 5, 2015

(54) RECOGNITION OF IMAGE ON EXTERNAL DISPLAY

(75) Inventors: Ben Vaught, Seattle, WA (US); Ben Sugden, Woodinville, WA (US); Stephen Latta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 611 days.

(21) Appl. No.: 13/358,175

(22) Filed: Jan. 25, 2012

(65) Prior Publication Data
US 2013/0187835 A1   Jul. 25, 2013

(51) Int. Cl.
G09G 5/00   (2006.01)
G06F 3/01   (2006.01)
G06K 9/00   (2006.01)

(52) U.S. Cl.
CPC ............. *G06F 3/011* (2013.01); *G06F 3/013* (2013.01); *G06K 9/00604* (2013.01)

(58) Field of Classification Search
CPC ............ G02B 27/017; G02B 27/0172; G02B 2027/0132
USPC .......................... 345/7–9, 156–158
See application file for complete search history.

(56) References Cited

U.S. PATENT DOCUMENTS

| | | |
|---|---|---|
| 5,844,530 A | 12/1998 | Tosaki |
| 6,037,914 A | 3/2000 | Robinson |
| 6,304,234 B1 | 10/2001 | Horiuchi |
| 6,483,483 B2 | 11/2002 | Kosugi et al. |
| 2008/0137909 A1 | 6/2008 | Lee et al. |
| 2011/0141010 A1 | 6/2011 | Sakata et al. |
| 2011/0141011 A1 | 6/2011 | Lashina et al. |
| 2011/0170067 A1 | 7/2011 | Sato et al. |
| 2011/0298702 A1* | 12/2011 | Sakata et al. ............ 345/156 |

OTHER PUBLICATIONS

"International Search Report", Mailed Date: Jun. 2, 2013, Application No. PCT/US2013/022769, Filed: Jan. 23, 2013, pp. 10.
Ajanki, et al., "Ubiquitous Contextual Information Access with Proactive Retrieval and Augmentation", TKK Reports in Information and Computer Science, 2009, pp. 28.
Ki, et al., "3D Gaze Estimation and Interaction", Retrieved at <<http://ieeexplore.ieee.org/stamp/stamp.jsp?tp=&arnumber=4547886>>, 3DTV Conference: The True Vision—Capture, Transmission and Display of 3D Video, May 28-30, 2008, pp. 373-376.
Park, et al., "Wearable Augmented Reality System using Gaze Interaction", Retrieved at <<http://ieeexplore.ieee.org/stamp/stamp.jsp?tp=&arnumber=4637353>>, 7th IEEE/ACM International Symposium on Mixed and Augmented Reality, Sep. 15-18, 2008, pp. 175-176.

(Continued)

*Primary Examiner* — Kimnhung Nguyen
(74) *Attorney, Agent, or Firm* — Micah Goldsmith; Judy Yee; Micky Minhas

(57) ABSTRACT

Embodiments are disclosed that relate to the recognition via a see-through display system of an object displayed on an external display device at which a user of the see-through display system is gazing. For example, one embodiment provides a method of operating a see-through display system comprising acquiring an image of an external display screen located in the background scene via an outward facing image sensor, determining via a gaze detection subsystem a location on the external display screen at which the user is gazing, obtaining an identity of an object displayed on the external display screen at the location determined, and performing an action based upon the identity of the object.

20 Claims, 7 Drawing Sheets

(56) References Cited

OTHER PUBLICATIONS

Handa, et al., "Development of head-mounted display with eye-gaze detection function for the severely disabled", Retrieved at <<http://ieeexplore.ieee.org/stamp/stamp.jsp?tp=&arnumber=4592769>>, VECIMS 2008. IEEE Conference on Virtual Environments, Human-Computer Interfaces and Measurement Systems, Jul. 14-16, 2008, pp. 140-144.

"Gaze-Based Interaction", Retrieved at <<http://www.smivision.com/en/gaze-and-eye-tracking-systems/applications/gaze-based-interaction.html?gclid=CPOI4JCDiKwCFcYa6wod2T6B8w>>, Retrieved Date: Oct. 27, 2011, pp. 2.

* cited by examiner

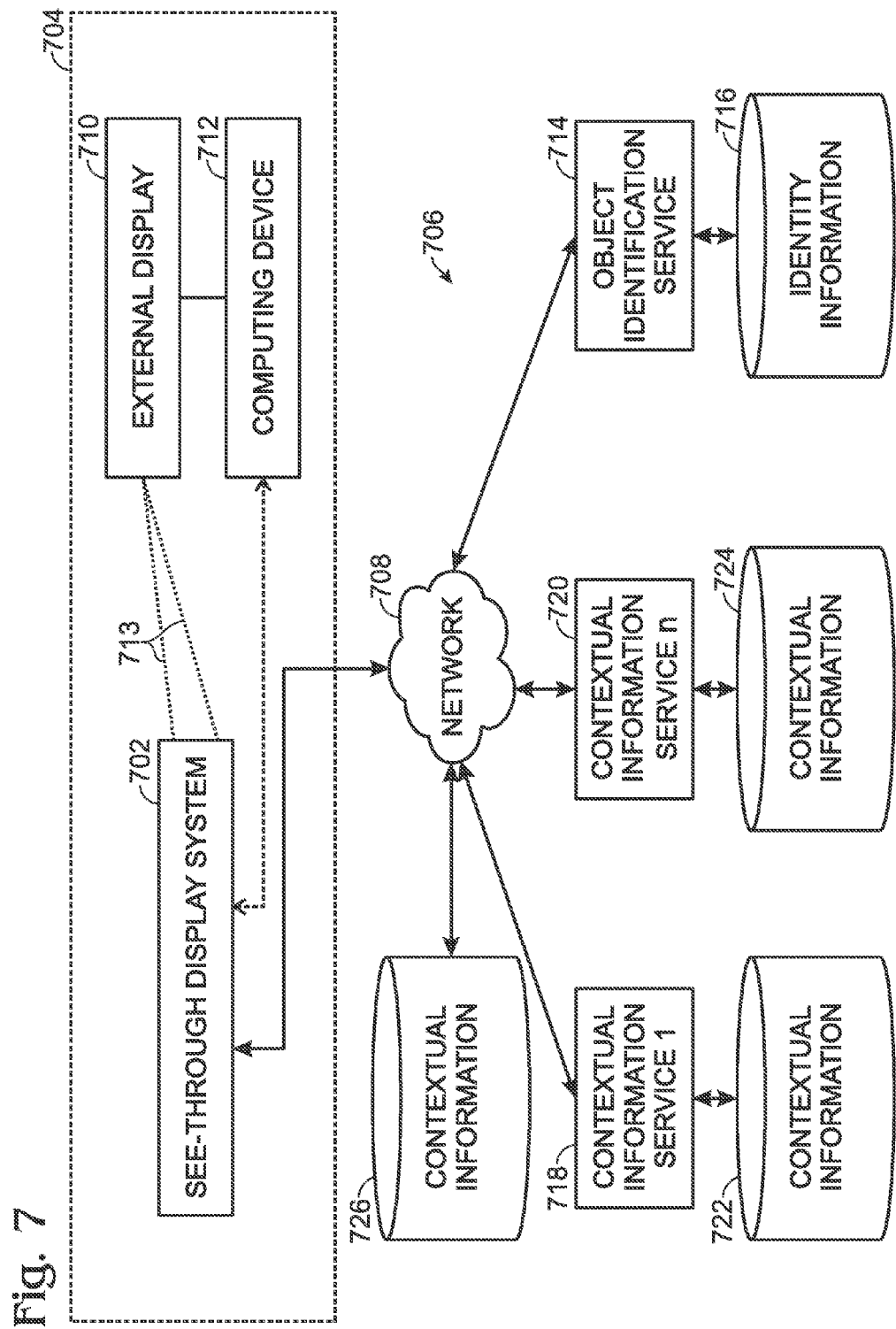

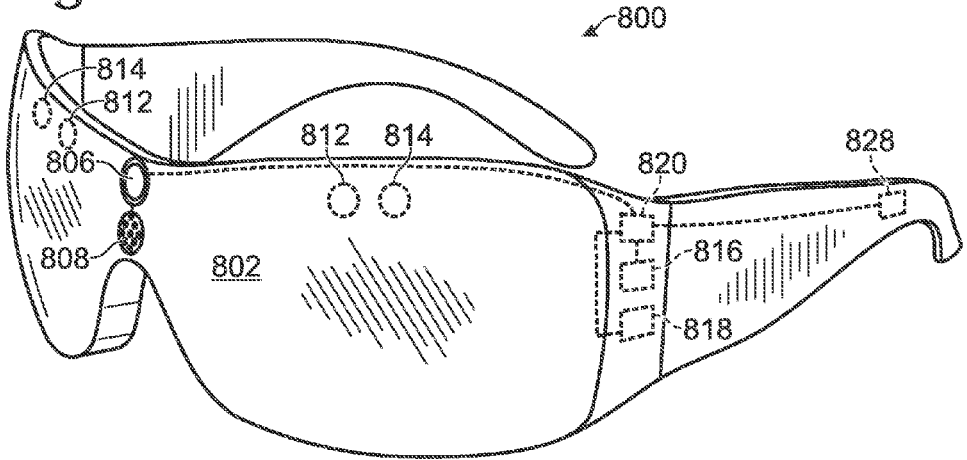
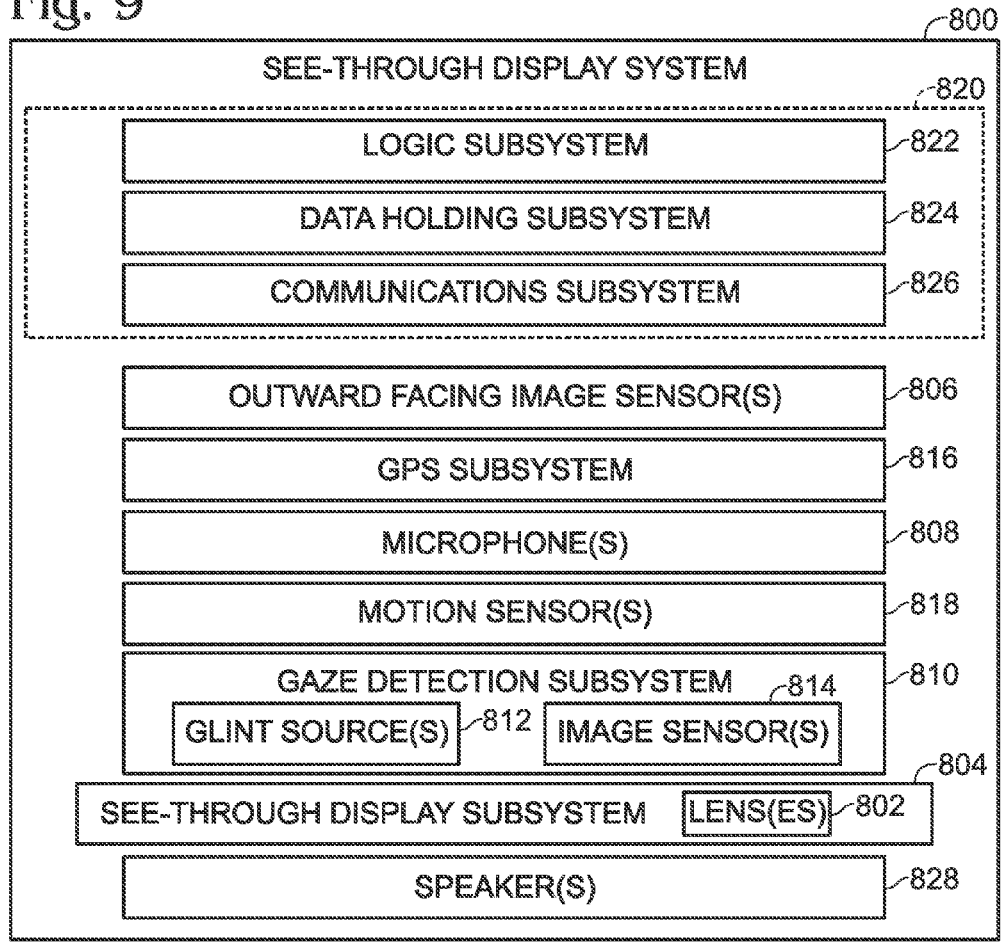

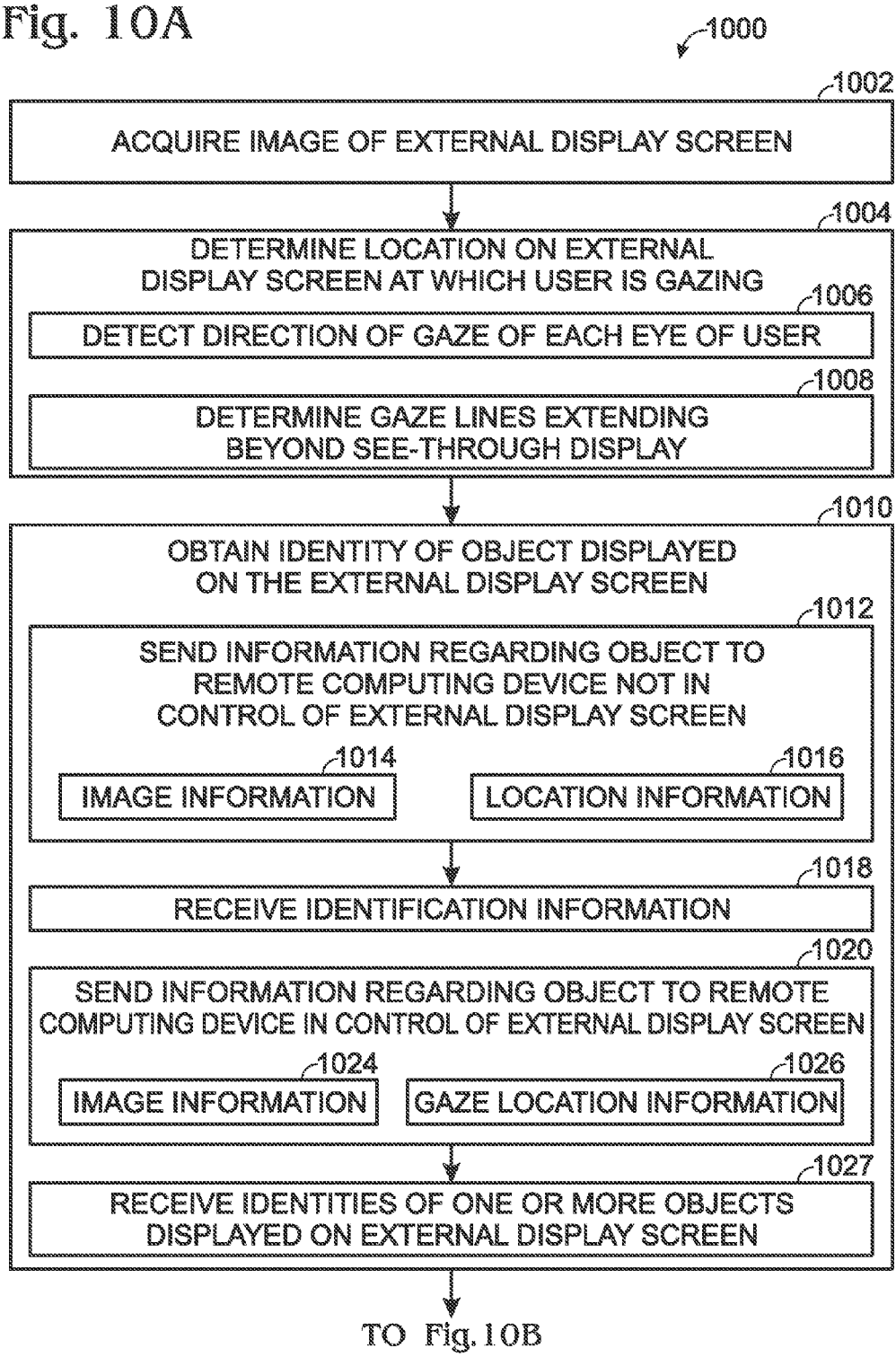

RECOGNITION OF IMAGE ON EXTERNAL DISPLAY

BACKGROUND

Augmented or mixed reality technologies allow virtual imagery to be mixed with a user's actual view of the real world. For example, a near-eye display system comprising a see-through display may be worn by a user to view the mixed imagery of virtual and real objects. Such a display system overlays virtual imagery in the user's field of view, and thereby allows the display of digital content configured to enhance real-world experiences.

SUMMARY

Embodiments are disclosed herein that relate to the recognition via a see-through display system of an object displayed on an external display device at which a user of the see-through display system is gazing. For example, one disclosed embodiment provides a method of operating a see-through display system that includes a see-through display screen, a gaze detection subsystem configured to determine a direction of gaze of each eye of the user, and an outward facing image sensor configured to acquire images of a background scene relative to a user of the see-through display system. The method comprises acquiring an image of an external display screen located in the background scene via the outward facing image sensor, determining via the gaze detection subsystem a location on the external display screen at which the user is gazing, obtaining an identity of an object displayed on the external display screen at the location determined, and performing an action based upon the identity of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows an embodiment of a use environment for a see-through display system.

FIG. 8 shows an embodiment of a see-through display system.

FIG. 9 shows a block diagram of the embodiment of FIG. 9

DETAILED DESCRIPTION

As mentioned above, a see-through display system may allow virtual imagery to be mixed with real-world background images, thereby enhancing real-world experiences. However, the ability to fully realize the potential of such interactions may be limited by the ability of a see-through display system to analyze and react to objects located in a wide range of real-world backgrounds, as well as the ability to determine particular objects in the real world background at which a user's gaze is directed.

Accordingly, embodiments are disclosed herein that relate to the use of a see-through display system, such as a head-mounted display (HMD), that utilizes gaze detection and outward-facing image sensor(s) to acquire and utilize information related to particular objects in the field of view of the user that are the subject of a user's current focus, such as objects shown on a display screen external to the see-through display device. This may allow the presentation of enhanced experiences via a see-through display system in virtually any use environment.

In some embodiments, contextual information related to an object of interest on an external display screen may be obtained from a source other than a device controlling the external display screen. In such embodiments, image recognition techniques may be used to determine an identity of the object on the external display screen at which the user is gazing so that contextually relevant information about the object may be obtained and displayed. In other embodiments, the see-through display system may communicate with the device controlling the external display screen. This may allow a fusion of experiences, where a user may "select" a particular object on the external display screen by gazing at the particular object on a user interface displayed on the external display screen.

Figure 1:
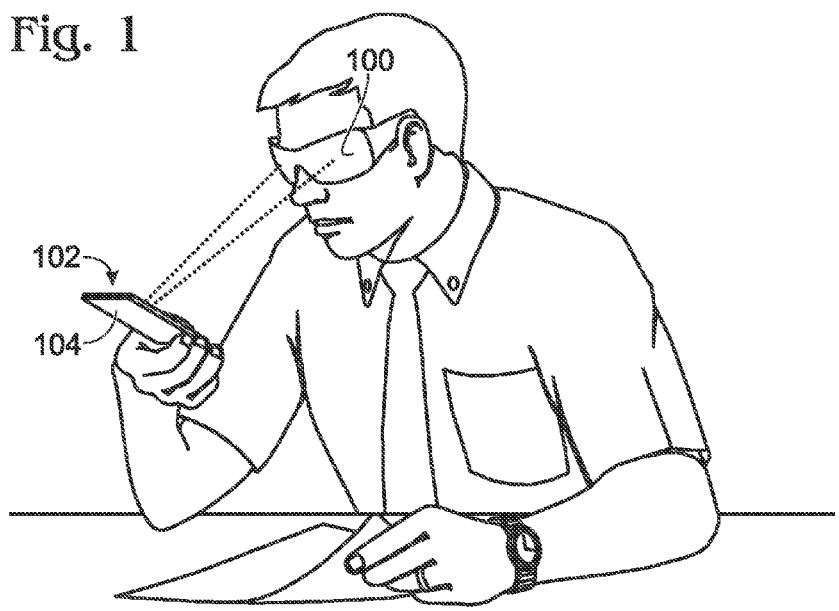
FIG. 1 depicts a user of an embodiment of a see-through display system gazing at a display screen external to the see-through display system.
Figure 2:
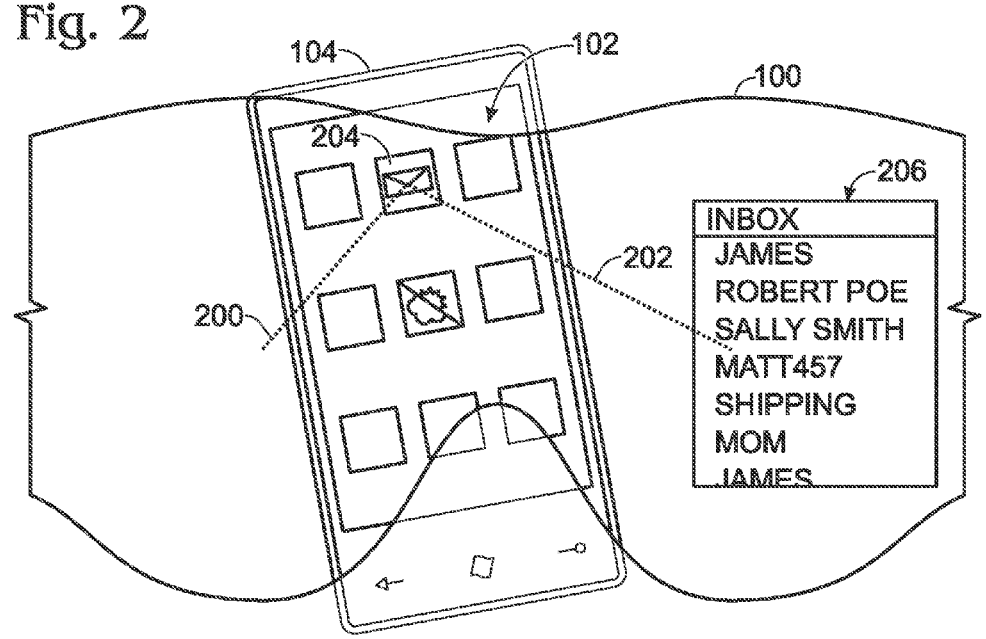
FIG. 2 shows a view from the perspective of the user of FIG. 1 when the user is gazing at a first virtual object displayed on the external display.

FIGS. 1 and 2 show an example use environment in which a user of an embodiment of a see-through display system 100 retrieves via the see-through display system information relevant to an object displayed on an example external display screen 102, shown as being incorporated into a mobile device 104. As can be seen in FIG. 2, gaze lines 200, 202 are determined to lead from the eyes of the user to an email user interface tile 204. In response, the see-through display system 100 retrieves and displays a list 206 of messages currently in the inbox of an email account linked to the user's mobile device 104. The user may then be able to open a selected message by gazing at the selected message in the inbox displayed on the see-through display system 100. As mentioned above, the see-through display system 100 may receive the inbox information via communication with the mobile device 104, or via communication with another device, such as a network-accessible email service.

Figure 3:
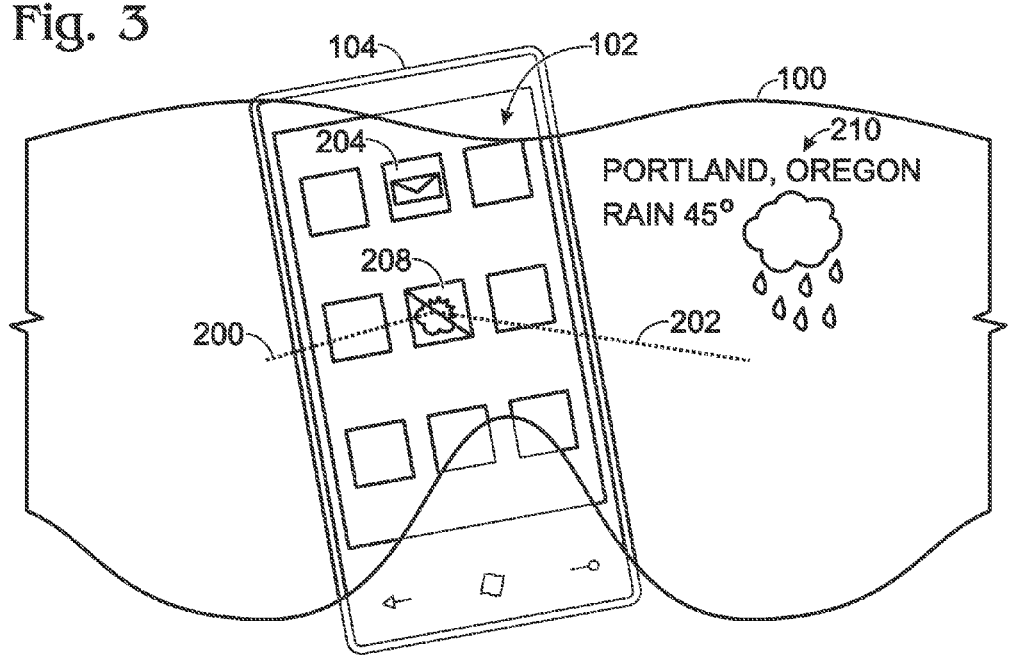
FIG. 3 shows a view from the perspective of the user of FIG. 1 when the user is gazing at a second virtual object displayed on the external display.

Similarly, the user may be able to retrieve contextual information regarding other user interface elements displayed on the external display screen by gazing at the other user interface elements. For example, referring to FIG. 3, the user has ceased gazing at the email user interface tile 204, and is instead gazing at a weather user interface tile 208 displayed on the external display screen 102. In response, the see-through display system 100 retrieves and displays a current weather report 210.

Figure 4:
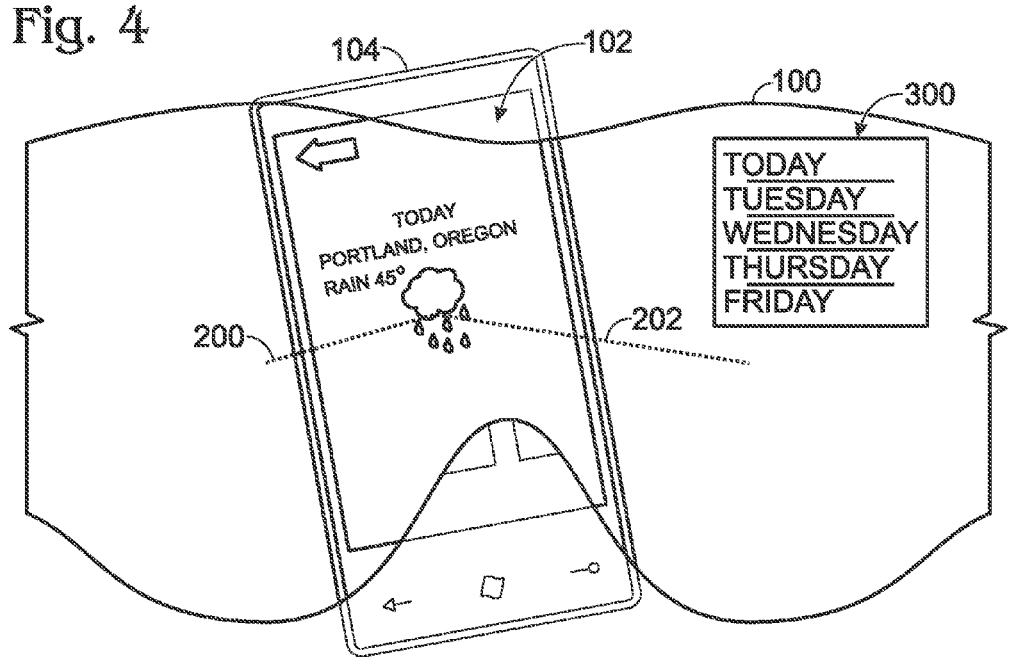
FIG. 4 shows a view from the perspective of the user of FIG. 1 after the user has made a gaze-based user input via the see-through display system to a device controlling the external display.

As mentioned above, in some instances, the see-through display system 100 may communicate with the device that controls the external display, e.g. the mobile device 104 in the embodiment of FIG. 1. In such embodiments, the see-through display system 100 may also act as a user input device that allows a user to "select" a particular user interface control displayed on the external display screen. FIG. 4 shows an example of such an interaction in the context of the user gazing at the weather tile of FIG. 3. In response to detecting the user gazing at the weather user interface tile 208, the head-mounted display system 100 may send a user input command to the mobile device 104 selecting the weather tile 208, thereby resulting in the display of weather information on the external display screen 102 of the mobile device 104.

FIG. 4 also shows the display of additional weather-related user interface items 300 on the see-through display. A user may interact with the additional weather-related user interface items 300 via gaze, and selection of one of the additional weather-related user interface items may result in the display of relevant information by the mobile device 104, by the see-through display system 100, or by a combination of these devices. It will be understood that such additional user interface items also may be displayed on the mobile device 104. It will further be understood that such additional user interface items may be displayed on both the mobile device 104 and the see-through display system 100. In this manner, the see-through display system 100 and the mobile device 104 may cooperate to present an integrated multi-display user interface experience.

Figure 5:
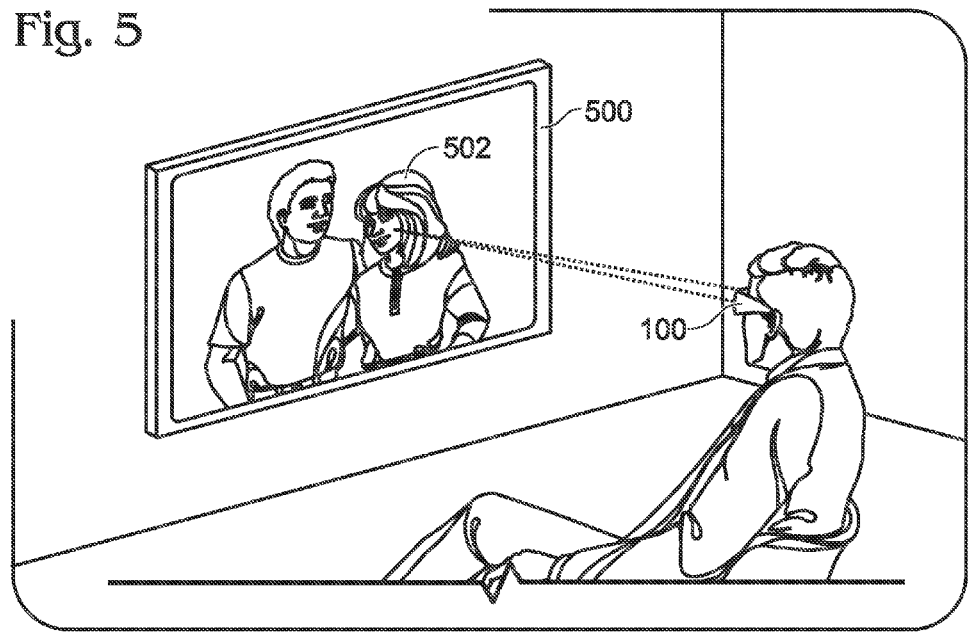
FIG. 5 shows a depiction of a user of an embodiment of a see-through display system viewing another example external display.
Figure 6:
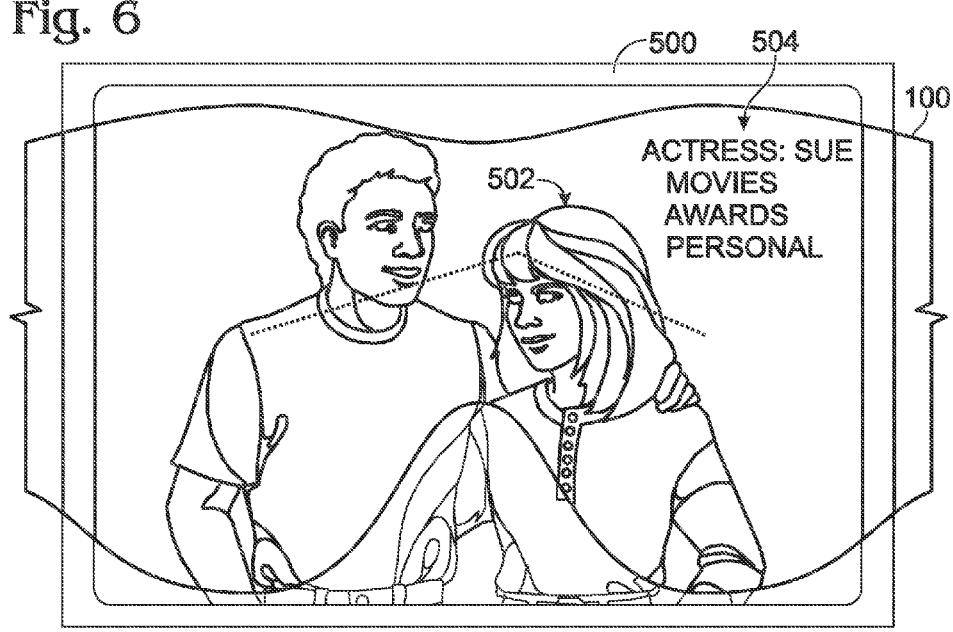
FIG. 6 shows a view from the perspective of the user of FIG. 5 when the user is gazing at a first actor displayed on the external display of FIG. 5.

The embodiments of FIGS. 1-4 illustrate a use environment in which a user gazes at an external display screen incorporated into and controlled by a mobile device. However, it will be understood that a user may view any other suitable external display device via a see-through display system according to the present disclosure. FIGS. 5-6 illustrate another example use environment in which a user is watching via the see-through display system 100 an external display screen in the form of a television 500 and gazing at a particular actress 502. The see-through display system 100 may determine that the user is gazing at the actress by gaze and image analysis, and in response obtain and display information 504 regarding the actress 502. Similar methods may be used in conjunction with displays in storefronts, sports stadiums, and the like that may be controlled by third parties. As a more specific example, a user gazing at an electronic display in a storefront may receive via a see-through display system information on an object shown on the display.

In the example of FIGS. 5-6, the see-through display system 100 displays a menu of items of information about the actress that a user may browse, for example, via gaze control, voice control, or in any other suitable manner. However, it will be understood that the see-through display system 100 may display any other suitable information. It will further be understood that, in embodiments where the see-through display device is configured to communicate with the television 500, a user may control the television 500 via gaze commands. For example, a user may change channels, interact with a video game system or a digital video recorder (e.g. to bring up a menu of recorded items in which the actor at which the user is gazing appears), and perform other such control actions, by gazing at corresponding objects on the television screen. Likewise, gaze commands may be used to zoom, shift, and/or otherwise change an image to highlight a particular object of interest in a current scene. In yet other embodiments, optically readable tags may be embedded in an image displayed on an external display screen (e.g. within video content) such that the tags are associated with particular objects on the screen. In such embodiments, when a user gazes at a tagged object, the tags may be used to obtain information about the object without having to perform image analysis to identify the object.

In some embodiments, a determination of a user's intent to interact with an object at which the user is gazing may be made before information regarding the object is obtained and displayed. In such embodiments, the user's intent may be determined in any suitable manner. For example, an intent of the user to interact with the displayed object may be determined from sensor input indicating that the user's gaze is directed at the displayed object for a threshold amount of time. Such an intent may be determined from any suitable gaze duration, including but not limited to durations of 500 msec, 1 second, or 5 seconds. In other embodiments, the user's intent to interact may be determined via voice recognition analysis of audio input received from the user, by outward facing sensor input capturing a hand and/or arm gesture of the user, by inward facing sensor input capturing an eye gesture of a user, by motion data capturing a head (or body) gesture of the user, or via any other suitable input or combination of inputs.

FIG. 7 shows a block diagram of an example use environment 700 for a see-through display system 702. Use environment 700 includes a local use environment 704 comprising devices at the user's immediate locale, and a network environment 706 accessible by the see-through display system 702 via a network 708. The see-through display system 702 may comprise any suitable type of device, including but not limited to the HMD shown in FIGS. 1-6.

The local use environment 704 comprises the see-through display system 702, and an external display screen 710 controlled by a computing device 712 configured to provide output to the external display screen 710. The external display screen 710 and the computing device 712 may be separate devices or integrated into a same device, and may represent any suitable type of display and computing device. Non-limiting examples of such display screens include screens on mobile communications devices (e.g. smart phones), portable media players, televisions (e.g. two-dimensional or three-dimensional high-definition televisions), and computer monitors, as well as movie theater screens, electronic billboards, and other such large-format display screens (e.g. at sports venues).

As shown, the see-through display system 702 is configured to project a determined gaze line 713 from each eye of a user onto the external display screen 710 to determine a location on the external display screen at which the user is currently gazing. The see-through display system 702 may utilize any suitable mechanism for determining such gaze lines, including but not limited to inward-facing image sensors configured to track eye motion, outward facing image sensors configured to acquire images of a field of view of the user, and/or inertial motion sensors configured to provide data for tracking user movements.

Image data acquired by the outward-facing image sensors may be used to obtain an identification of an object on the external display screen 710 at which the user is gazing. For example, in embodiments in which the see-through display system 702 communicates with the computing device 712 that controls the external display screen 710, the computing device 712 may provide information to the see-through display system 702 identifying objects displayed on the external display screen 710. The see-through display system 702 may then compare an image of the object intersected by the gaze lines 713 to the information provided by the computing device 712 to identify the particular object at which the user is gazing. It will be understood that communication between the see-through display system 702 and the computing device 712 that controls the external display screen 710 may be wired or wireless. It further will be understood that, in such embodiments, the see-through display system may send to the computing device 712 image data of the object at the location at which the user is gazing for identification of the image by the computing device 712.

Likewise, in embodiments in which the see-through display system 702 does not communicate with the computing device 712 that controls the external display screen, image data representing a portion of the external display screen 710 at which the user is gazing may be sent to a network-accessible object identification service 714 for identification. The object identification service 714 may compare the image data to image data in an identity information store 716 to identify the object. The object identification service may then return the identity of the object to the see-through display system 702. As described in more detail below, other information, such as location information, also may be sent to the object identification service to facilitate the identification of the object.

The depicted use environment 700 further comprises a plurality of contextual information services, depicted as contextual information service 1 718 and contextual information service n 720. The contextual information services 718, 720 are configured to receive queries from devices such as the see-through display system 702, and to provide information relevant to the query provided. The contextual information services 718, 720 may take any suitable form, such as publicly accessible and/or restricted access web sites. Each contextual information service is configured to access one or more information stores, depicted as local information stores 722, 724 and network-accessible information store 726. As non-limiting examples, a contextual information service may take the form of a search engine that searches across a network, or of a proprietary database service.

The see-through display system 702 may be configured to access different contextual information services depending upon the identification of the object at which the user is gazing. For example, where the user is gazing at an email user interface control, the see-through display system 702 may access the user's email account via an email service. Likewise, where the user is gazing at a particular actor displayed on a television, the see-through display system 702 may access a media database that stores information related to television and movie actors. In this manner, the see-through display system 702 operating in use environment 700 may acquire information for display that is contextually relevant to a particular object on an external display screen at which a user is gazing.

The see-through display system 702 may take any suitable form. As mentioned above, in some embodiments, a see-through display system may comprise a pair of glasses in which the lenses act as see-through display screens. FIG. 8 shows an embodiment of such a see-through display system 800, and FIG. 9 shows a block diagram of the see-through display system 800. The see-through display system 800 comprises one or more lenses 802 that form a part of a see-through display subsystem 804, such that images may be projected onto the lenses 802, or produced by image-producing elements (e.g. see-through OLED displays) located within the lenses 802. The see-through display system 800 further comprises one or more outward facing image sensors 806 configured to acquire images of a background scene being viewed by a user, and may include one or more microphones 808 configured to detect sounds, such as voice commands from a user. The outward facing image sensors 806 may include one or more depth sensors and/or one or more two-dimensional image sensors.

The see-through display system 800 further comprises a gaze detection subsystem 810 configured to detect a direction of gaze of each eye of a user, as described above. The gaze detection subsystem 810 may be configured to determine gaze directions of each of a user's eyes in any suitable manner. For example, in the depicted embodiment, the gaze detection subsystem 810 comprises one or more glint sources 812, such as infrared light sources, configured to cause a glint of light to reflect from each eyeball of a user, and one or more image sensors 814 configured to capture an image of each eyeball of the user. Changes in the glints from the user's eyeballs as determined from image data gathered via image sensor(s) 814 may be used to determine a direction of gaze. Further, a location at which gaze lines projected from the user's eyes intersect the external display may be used to determine an object at which the user is gazing (e.g. a virtual object displayed on an external display). The gaze detection subsystem 810 may have any suitable number and arrangement of light sources and image sensors. In one non-limiting example embodiment, four glint sources and one image sensor are used for each eye.

The see-through display system 800 may further comprise additional sensors. For example, see-through display system 800 may comprise a global positioning (GPS) subsystem 816 to allow a location of the see-through display system 800 to be determined. Information regarding the user's location may then be used, for example, to help determine the identity of an object on an external display at which the user is gazing. As one example, location information may be used to determine that a user is in a particular movie theater. This information may then be used to help identify contextual information, for example, by identifying a movie playing at that particular time in that particular theater and actors starring in that particular movie. Likewise, the see-through display system 800 may comprise a clock (not shown) or otherwise be configured to receive a remotely generated time signal, to provide additional information that may be used to determine the context of a user's current environment. For example, information regarding the time that the user is in the particular movie theater may allow the identity of a movie being watched to be determined. This information may then be used by the see-through display system 800 to retrieve and present information relevant to objects in the movie being watched.

The see-through display system 800 further may include one or more motion sensors 818 to detect movements of a user's head when the user is wearing the see-through display system 800. Motion data may be used, potentially along with eye-tracking glint data and outward-facing image data, for gaze detection, as well as for image stabilization to help correct for blur in images from the outward-facing image sensor(s) 806. The use of motion data may allow changes in gaze location to be tracked even if image data from the outward-facing image sensor(s) 806 cannot be resolved. Likewise, the motion sensors 818, as well as the microphone(s) 808 and the gaze detection subsystem 810, also may be employed as user input devices, such that a user may interact with see-through display system 800 via gestures of the eye, neck and/or head, as well as via verbal commands. It will be understood that sensors illustrated in FIGS. 8 and 9 are shown for the purpose of example and are not intended to be limiting in any manner, as any other suitable sensors and/or combination of sensors may be utilized.

The see-through display system 800 further comprises a controller 820 having a logic subsystem 822 and a data holding subsystem 824 in communication with the sensors, the gaze detection subsystem 810, and the see-through display subsystem 804. The data holding subsystem 824 comprises instructions stored thereon that are executable by logic subsystem 822, for example, to receive and interpret inputs from the sensors, to determine an object at which the user is gazing, to send information (e.g. image data) to an external computing device for identification of the object via a communications subsystem 826, and to receive and potentially present contextual information regarding the object via the see-through display subsystem 804, and/or via one or more speakers 828. It will be understood that data holding subsystem 824 also may store information regarding other objects displayed on the external display screen (e.g. a list of user interface controls locations and identities/functions).

Figure 10B:
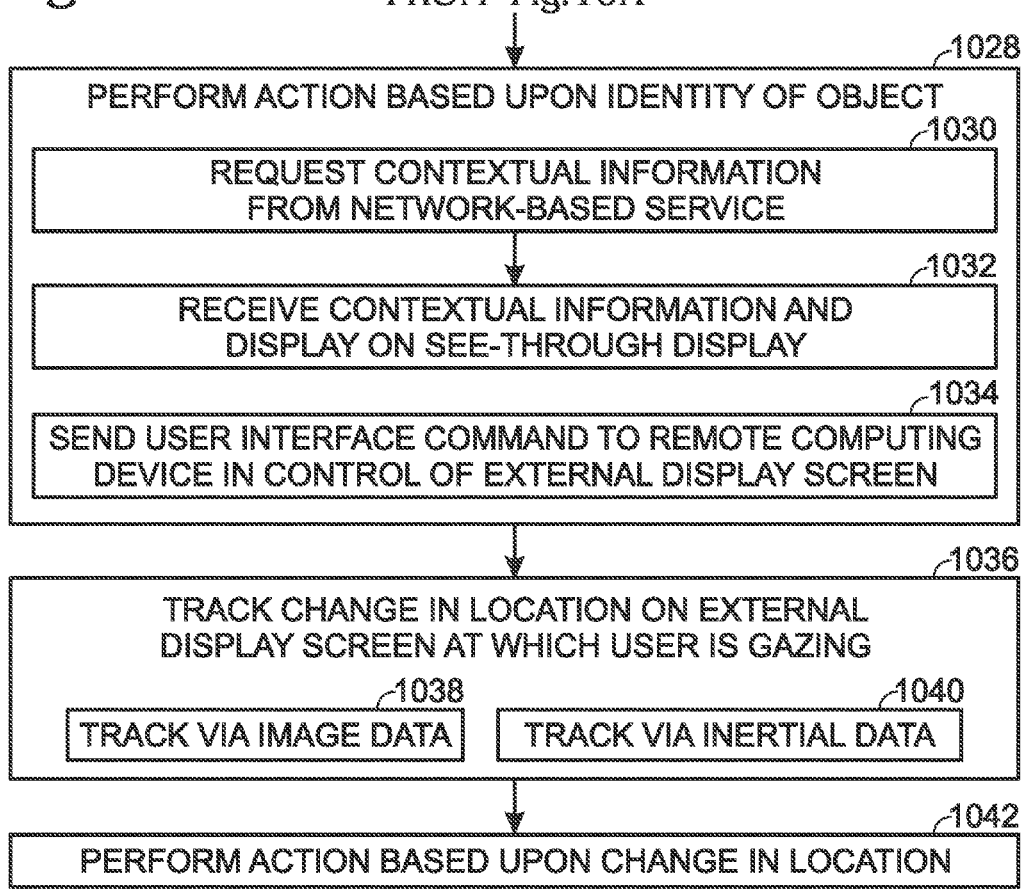
FIG. 10 shows a flow diagram depicting an embodiment of a method of operating a see-through display system.

FIG. 10 shows an embodiment of a method 1000 of operating a see-through display system according to the present disclosure. Method 1000 comprises, at 1002, acquiring one or more images of an external display screen located in background scene. This may comprise, for example, receiving two-dimensional and/or three-dimensional still or video image data from one or more outward-facing image sensors on a see-through display device, and locating the external display screen in the image data.

Method 1000 next comprises, at 1004, determining a location on external display screen at which user is gazing. This may comprise, for example, receiving image data from one or more inward-facing image sensors, and analyzing the image data to determine the position of the user's eye based upon location of glints reflected from the eye of the user. This may allow the detection of a direction of gaze of each eye of the user, as indicated at 1006. Gaze lines may then be projected through and beyond the see-through display device to the external display screen, as indicated at 1008. In some embodiments, determining the location on the external display at which the user is gazing may further comprise analyzing motion data from one or more inertial motion sensors to track movement of the user's gaze.

Method 1000 next comprises, at 1010, obtaining an identity of object displayed on the external display screen based upon a location at which the determined gaze lines intersect the external display screen. This may comprise various processes. For example, in some instances the see-through display device may not be in communication with the computing device that controls the external display screen. As such, method 1000 may comprise, at 1012, sending information regarding the object to a remote computing device, such as a network accessible object identity service, that is not in control of the external display screen. Any suitable information may be sent to the remote computing device. Examples include, but are not limited to, image information 1014 (e.g. image data representing the object), and/or location information (e.g. GPS data) that may facilitate the matching of image information 1016 to object image data by the remote computing device. After sending the information regarding the object to the remote computing system, identification information is received from the remote computing system at 1018.

In other instances, the see-through display device may be in communication with the computing device that controls the external display screen. As such, method 1000 may comprise, at 1020, sending information regarding the object to a remote computing device in control of the external display screen, such as a mobile device, television system, or other suitable computing device. Any suitable information may be sent, including but not limited to image information 1024 and gaze location information 1026 that specifies the location of the gaze on the screen. After sending the information regarding the object to the computing system in control of the external display screen, information regarding the identities of one or more objects displayed on the external display screen is received from the computing system at 1027.

In some instances, information regarding multiple objects displayed on the external display screen, such as the location and identification of multiple user interface controls displayed on the external display screen, may be received from the computing device in control of the external display screen. In such instances, the information sent to the computing device that controls the external display screen may comprise a specific user interface command, rather than (or in addition to) image or location information.

Continuing, method 1000 next comprises, at 1028, performing an action based upon the identity of the object. The see-through display device may perform any suitable action based upon the identity of the object. For example, as shown at 1030, the see-through display device may request contextual information from a network-based service. As a more specific example, if a user is gazing at an actor on a movie screen, the see-through display device may request information about the actor after obtaining the identity of the actor. The contextual information then is received from the network-based service and displayed at 1032. As another example of a suitable action, the see-through display device may send a user interface command to a computing device that is in control of the external display screen, as indicated at 1034 and described above.

In some embodiments, a see-through display device may track changes in gaze location, as indicated at 1036. This may help to ensure that the displayed contextual information remains when the user's gaze shifts to different displayed objects. Such changes may be tracked via image data 1038, by inertial motion data 1040, and/or in any other suitable manner. In response to a tracked change in gaze location, method 1000 comprises, at 1042, performing an action based upon the change in gaze location. For example, if the change in gaze location moved from one tile on a mobile device user interface to another tile, the action may comprise obtaining an identification of the new tile, obtaining contextual information based upon the identification of the new tile, and displaying this additional information via the see-through display system. It will be understood that this specific example is described for the purpose of illustration, and is not intended to be limiting in any manner.

In the depicted embodiments, outward facing image data acquired by a see-through display device is used to project gaze lines through the see-through display device onto the external display screen. In other embodiments, gaze line projection may be performed by a combination of a see-through display device worn or carried by a user, and an external image capture and analysis system comprising a depth sensor. In such embodiments, the external image capture and analysis system may determine gaze lines based upon a depth map of the use environment to determine a location of the external display screen at which the user is gazing. The location may then be matched to a displayed object either by communication between the external image capture and analysis system (e.g. a video game system or other entertainment system) and the computing device in control of the external display screen (e.g. a mobile device). This may be communicated to the see-through display device for the retrieval of contextual information regarding the object by the see-through display device. Once the initial gaze lines have been determined, motion sensors in the see-through display device (and potentially the external display device, e.g. a mobile device) may be used to track changes in gaze.

As mentioned above, in some embodiments, the above described methods and processes may be tied to a computing system including one or more computers. Examples of such computing systems include, but are not limited to, see-through display devices such as HMDs, computing devices in control of display screens external to such see-through display devices (e.g. mobile devices, television systems, etc.), and computer systems implementing network-accessible services. In particular, the methods and processes described herein may be implemented as a computer application, computer service, computer API, computer library, and/or other computer program product.

Figure 11:
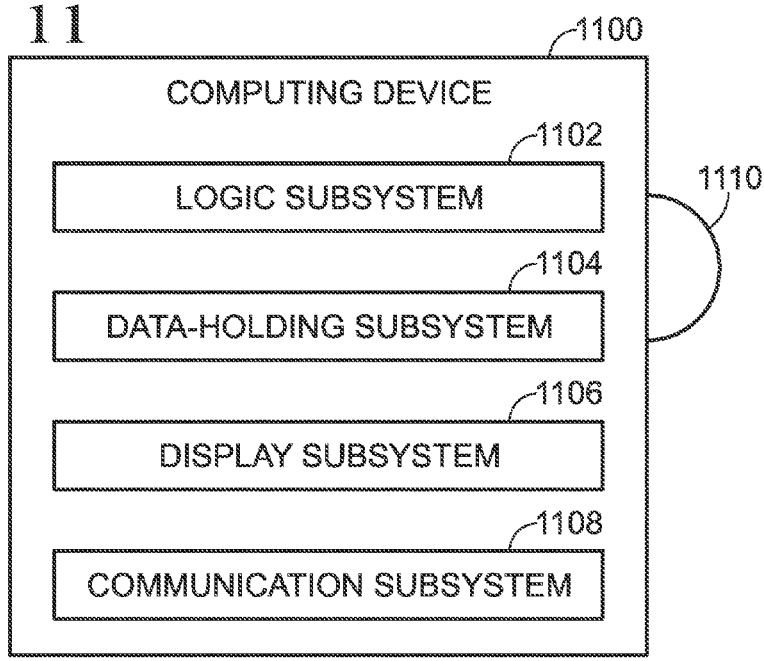
FIG. 11 shows a block diagram depicting an embodiment of a computing device.

FIG. 11 schematically shows a nonlimiting computing system 1100 that may perform one or more of the above described methods and processes. Computing system 1100 is shown in simplified form. It is to be understood that virtually any computer architecture may be used without departing from the scope of this disclosure. In different embodiments, computing system 1100 may take the form of a mainframe computer, server computer, desktop computer, laptop computer, tablet computer, home entertainment computer, network computing device, mobile computing device such as a smart phone or media player, mobile communication device, gaming device, see-through display system, etc.

Computing system 1100 includes a logic subsystem 1102 and a data holding subsystem 1104. Computing system 1100 may optionally include a display subsystem 1106, communication subsystem 1108, and/or other components not shown in FIG. 11. Computing system 1100 may also optionally include user input devices such as keyboards, mice, game controllers, cameras, microphones, and/or touch screens, for example, as well as the other input devices such as those described above for the see-through display system 800.

Logic subsystem 1102 may include one or more physical devices configured to execute one or more instructions. For example, logic subsystem 1102 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 1102 may include one or more processors that are configured to execute software instructions. Additionally or alternatively, logic subsystem 1102 may include one or more hardware or firmware logic machines configured to execute hardware or firmware instructions. Processors of logic subsystem 1102 may be single core or multicore, and the programs executed thereon may be configured for parallel or distributed processing. Logic subsystem 1102 may optionally include individual components that are distributed throughout two or more devices, which may be remotely located and/or configured for coordinated processing. One or more aspects of logic subsystem 1102 may be virtualized and executed by remotely accessible networked computing devices configured in a cloud computing configuration.

Data holding subsystem 1104 may include one or more physical, non-transitory, devices configured to hold data and/or instructions executable by logic subsystem 1102 to implement the herein described methods and processes. When such methods and processes are implemented, the state of data holding subsystem 1104 may be transformed (e.g., to hold different data).

Data holding subsystem 1104 may include removable media and/or built-in devices. Data holding subsystem 1104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data holding subsystem 1104 may include devices with one or more of the following characteristics: volatile, nonvolatile, dynamic, static, read/write, read-only, random access, sequential access, location addressable, file addressable, and content addressable. In some embodiments, logic subsystem 1102 and data holding subsystem 1104 may be integrated into one or more common devices, such as an application specific integrated circuit or a system on a chip.

FIG. 11 also shows an aspect of the data holding subsystem in the form of removable computer-readable storage media 1110, which may be used to store and/or transfer data and/or instructions executable to implement the herein described methods and processes. Removable computer-readable storage media 1110 may take the form of CDs, DVDs, HD-DVDs, Blu-Ray Discs, EEPROMs, and/or floppy disks, among others.

It is to be appreciated that data holding subsystem 1104 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

It is to be appreciated that a "service", as used herein, may be an application program executable across multiple user sessions and available to one or more system components, programs, and/or other services. In some implementations, a service may run on a server responsive to a request from a client.

Display subsystem 1106 may be used to present a visual representation of data held by data holding subsystem 1104. As the herein described methods and processes change the data held by the data holding subsystem, and thus transform the state of the data holding subsystem, the state of display subsystem 1106 may likewise be transformed to visually represent changes in the underlying data. Display subsystem 1106 may include one or more display devices utilizing virtually any type of technology. Such display devices may be combined with logic subsystem 1102 and/or data holding subsystem 1104 in a shared enclosure, or such display devices may be peripheral display devices.

Communication subsystem 1108 may be configured to communicatively couple computing system 1100 with one or more other computing devices. Communication subsystem 1108 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 1100 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a see-through display system, the see-through display system comprising a see-through display screen, a gaze detection subsystem comprising an inward facing image sensor configured to acquire image data of each eye of a user of the see-through display system, and an outward facing image sensor configured to acquire images of a background scene relative to the user, the method comprising:
acquiring an image of an external display screen located in the background scene and viewable through the see-through display screen via the outward facing image sensor;
acquiring one or more images of each eye of the user via the inward facing image sensor;
determining via the one or more images of each eye of the user and the image of the external display screen a location on the external display screen at which the user is gazing through the see-through display screen;
obtaining an identity of an object displayed on the external display screen at the location determined; and
performing an action based upon the identity of the object.

2. The method of claim 1, wherein obtaining the identity of the object comprises sending image information regarding the object to a remote computing device, and receiving the identity from the remote computing device.

3. The method of claim 2, wherein the remote computing device is not in control of the external display screen.

4. The method of claim 3, wherein performing an action comprises displaying contextual information related to the object on the see-through display.

5. The method of claim 4, further comprising sending a request for the contextual information to a network-based service after obtaining the identity, and receiving the contextual information from the network-based service.

6. The method of claim 3, wherein the remote computing device is in control of the external display screen.

7. The method of claim 6, wherein the object comprises a control on a user interface displayed on the external display screen, and wherein performing an action based upon the identity of the object comprises sending a user interface input command to the remote computing device.

8. The method of claim 6, wherein obtaining the identity comprises receiving from the remote computing device identities and locations of multiple objects displayed on the external display screen.

9. The method of claim 2, further comprising sending location information to the remote computing device.

10. The method of claim 1, further comprising tracking a change in location on the external display screen at which the user is gazing, and displaying a response to the change in location on the see-through display system.

11. The method of claim 10, wherein tracking changes comprises tracking changes via image data.

12. The method of claim 10, wherein tracking changes comprises tracking changes via motion data.

13. A head-mounted display system, comprising:
a see-through display screen;
one or more inward facing image sensors configured to acquire images of each eye of a user;
one or more outward facing image sensors configured to acquire images of a background scene relative to the user;
a logic subsystem configured to execute instructions; and
a data holding subsystem comprising instructions stored thereon that are executable by the logic subsystem to:
acquire via the one or more outward facing image sensors an image of an external display screen located in the background scene;
determine via image data from the one or more inward facing image sensors and the image of the external display screen a location on the external display screen at which the user is gazing;
send to a remote computing device image information for identifying an object displayed on the external display screen at the location at which the user is gazing;
receive information from the remote computing device comprising an identity of the object; and
display contextual information related to the object on the see-through display screen.

14. The head-mounted display system of claim 13, wherein the instructions executable to send the image information for identifying the object to the remote computing device are further executable to send the image information to a computing device that is not in control of the external display screen.

15. The head-mounted display system of claim 14, wherein the instructions are further executable to send a request for the contextual information to a network-based service after obtaining the identity, and to receive the contextual information from the network-based service.

16. The head-mounted display system of claim 13, wherein the remote computing device is in control of the external display screen.

17. The head-mounted display system of claim 16, wherein the object comprises a control on a user interface displayed on the external display screen, and wherein the instructions are further executable to send to the remote computing device a user interface input command based upon the identity of the object.

18. The head-mounted display system of claim 16, wherein the information from the remote computing device comprises identities and locations of a plurality of objects displayed on the external display screen.

19. A head-mounted display system, comprising:
a see-through display screen;
one or more inward facing image sensors configured to acquire images of each eye of a user;
one or more outward facing image sensors configured to acquire images of a background scene relative to the user;
a logic subsystem configured to execute instructions; and
a data holding subsystem comprising instructions stored thereon that are executable by the logic subsystem to:
acquire via the one or more outward facing image sensors an image of an external display screen located in the background scene;
communicate with a remote computing device that is controlling the display of images on the external display screen;
determine via image data from the one or more inward facing image sensors and the image of the external display screen a location on the external display screen at which the user is gazing;
identify a user input control displayed on the external display screen at a location at which the user is gazing;
send to the remote computing device a user input command based upon the user input control.

20. The head-mounted display device of claim 19, wherein the instructions are executable to identify the user input control by receiving from the remote computing device information regarding locations of objects displayed on the external display screen controlled by the remote computing device, and to compare the location at which the user is gazing to the information regarding locations of objects.

* * * * *